(12) United States Patent
Nakajima et al.

(10) Patent No.: US 12,070,427 B2
(45) Date of Patent: Aug. 27, 2024

(54) MOVING DEVICE FOR ROD PART SUPPORTING INSTRUMENT HOSE AND DENTAL EXAMINATION-AND-TREATMENT APPARATUS INCLUDING MOVING DEVICE FOR ROD PART SUPPORTING INSTRUMENT HOSE

(71) Applicant: Takara Belmont Corporation, Osaka (JP)

(72) Inventors: Koji Nakajima, Osaka (JP); Hiroyuki Terayama, Osaka (JP)

(73) Assignee: Takara Belmont Corporation, Osaka (JP)

( * ) Notice: Subject to any disclaimer, the term of this patent is extended or adjusted under 35 U.S.C. 154(b) by 940 days.

(21) Appl. No.: 16/758,891

(22) PCT Filed: Nov. 17, 2017

(86) PCT No.: PCT/JP2017/041438
§ 371 (c)(1),
(2) Date: Apr. 24, 2020

(87) PCT Pub. No.: WO2019/097666
PCT Pub. Date: May 23, 2019

(65) Prior Publication Data
US 2020/0337930 A1 Oct. 29, 2020

(51) Int. Cl.
*A61G 15/18* (2006.01)
*F16F 1/12* (2006.01)

(52) U.S. Cl.
CPC ............... *A61G 15/18* (2013.01); *F16F 1/12* (2013.01); *F16F 1/121* (2013.01)

(58) Field of Classification Search
CPC ........ A61G 15/14; A61G 15/16; A61B 15/18; F16F 1/12; F16F 1/121; F16F 1/18; F16F 1/182
(Continued)

(56) References Cited

U.S. PATENT DOCUMENTS 3,484,831 A * 12/1969 Teiji ..................... A47C 20/045
403/120
3,740,852 A * 6/1973 Holmqvist ............. A61G 15/16
433/107

(Continued)

FOREIGN PATENT DOCUMENTS

| JP | 54-156952 A | 12/1979 |
|---|---|---|
| JP | 2014-230678 A | 12/2014 |
| JP | 2015-167674 A | 9/2015 |

OTHER PUBLICATIONS

International Search Report of PCT/JP2017/041438 dated Dec. 26, 2017 [PCT/ISA/210].

*Primary Examiner* — Christopher Garft
*Assistant Examiner* — Michael McDuffie
(74) *Attorney, Agent, or Firm* — Sughrue Mion, PLLC (57) ABSTRACT

A moving unit includes a housing, a rotary unit to which a rod part is attached, a spring that generates a torque when the rod part is tilted down or tilted up about a rotation axis on the side on which a base portion of the rod part is located, and a torque adjustment unit that is capable of adjusting a torque by deforming the spring. The torque adjustment unit includes a spring deforming portion that deforms the spring in a direction in which the spring is wound up and a spring fixing portion that keeps a torque constant by coming into contact with the spring deforming portion and fixing the spring deforming portion in place.

8 Claims, 10 Drawing Sheets

(58) Field of Classification Search
USPC ....... 248/566, 573, 574, 575, 576, 577, 592,
248/593, 608, 284.1, 291.1, 292.11,
248/292.13
See application file for complete search history.

(56) References Cited

U.S. PATENT DOCUMENTS

| | | | | |
|---|---|---|---|---|
| 4,345,616 | A * | 8/1982 | Terry | A61G 15/16 137/355.23 |
| 4,470,811 | A * | 9/1984 | Heubeck | A61G 15/16 433/108 |
| 5,297,961 | A * | 3/1994 | Hanson | A61G 15/16 433/77 |
| 5,402,690 | A * | 4/1995 | Sekiguchi | B25J 19/0016 248/280.11 |
| 5,909,864 | A * | 6/1999 | Wang | A47B 83/02 297/173 |
| 6,152,735 | A * | 11/2000 | Meyer | A61G 15/16 433/108 |
| 6,357,712 | B1 * | 3/2002 | Lu | F16M 11/10 248/185.1 |
| 6,644,611 | B1 * | 11/2003 | Tai | F16M 11/041 248/397 |
| 7,641,162 | B2 * | 1/2010 | Tsay | F16M 11/043 248/921 |
| 8,056,874 | B2 * | 11/2011 | Goodwin | A61G 5/10 403/112 |
| 8,196,884 | B2 * | 6/2012 | Chiang | A47B 21/0314 248/920 |
| 8,608,400 | B2 * | 12/2013 | Hong | G02B 7/00 403/220 |
| 8,746,641 | B2 * | 6/2014 | Fackler | F16M 11/10 343/882 |
| 8,899,537 | B2 * | 12/2014 | Kuan | F16M 11/2021 248/292.12 |
| 11,306,793 | B2 * | 4/2022 | Schutt | F16F 1/06 |
| 11,353,076 | B2 * | 6/2022 | Mohr | A01D 78/14 |
| 2005/0189457 | A1 * | 9/2005 | Wang | A47G 25/0685 248/292.12 |
| 2010/0129769 | A1 * | 5/2010 | Junge | A61G 15/16 433/77 |
| 2010/0266977 | A1 * | 10/2010 | Junge | A61G 15/16 433/78 |
| 2020/0337930 | A1 * | 10/2020 | Nakajima | F16F 1/121 |

* cited by examiner

MOVING DEVICE FOR ROD PART SUPPORTING INSTRUMENT HOSE AND DENTAL EXAMINATION-AND-TREATMENT APPARATUS INCLUDING MOVING DEVICE FOR ROD PART SUPPORTING INSTRUMENT HOSE

CROSS REFERENCE TO RELATED APPLICATIONS

This application is a National Stage of International Application No. PCT/JP2017/041438, filed Nov. 17, 2017.

TECHNICAL FIELD

The present disclosure relates to a moving device for a rod part supporting an instrument hose, the moving device enabling a rod part that supports a hose of an instrument installed in a dental clinic or the like to move, and to a dental examination-and-treatment apparatus that includes the moving device for a rod part supporting an instrument hose.

BACKGROUND ART

In the related art, examination-and-treatment apparatuses that are installed in dental clinics include holding devices that hold instruments. For example, a holding device described in PTL 1 mentioned below includes an instrument holder that holds an instrument and a swing arm that supports a hose connected to the instrument. The swing arm is formed in an elongated shape extending upward, and a spring is attached to a base portion thereof. The swing arm can be tilted down about the base portion, which acts as a shaft, and can be tilted up by the spring. A pulley body is supported at an end of the swing arm, and a hose is hooked on the pulley body.

When a user, such as a dentist or a dental hygienist, holds and pulls the instrument, the hose is pulled, and at the same time, the swing arm tilts down against the elastic force of the spring. When the pulled hose is slackened, the swing arm is tilted up by the elastic force of the spring and returns to the original state.

CITATION LIST

Patent Literature

[PTL 1] Japanese Unexamined Patent Application Publication No. 2015-167674

SUMMARY OF INVENTION

Technical Problem

Here, in the above-mentioned technology of the related art, the elastic force of the spring is constant. In contrast, the weights of the instrument and the hose differ according to their types, and the force with which the user pulls the instrument differ according to their preference. In other words, the difference between the elastic force of the spring and the force with which the user pulls the instrument varies depending on the type of the instrument or the type of the hose and also varies depending on the user. Consequently, it is difficult to enable every user to comfortably operate every instrument.

The present disclosure has been proposed in view of the above situation. In other words, it is an object of the present disclosure to provide a moving device for a rod part supporting an instrument hose, the moving device enabling every user to comfortably operate every instrument as a result of a torque being adjusted for each instrument, and a dental examination-and-treatment apparatus that includes the moving device for a rod part supporting an instrument hose.

Solution to Problem

To achieve the above-described object, a moving device for a rod part supporting an instrument hose according to the present disclosure includes a spring that generates a torque when a rod part that supports an instrument hose connected to an instrument is tilted down or tilted up about a rotation axis on a base portion side of the rod part and a torque adjustment unit that is capable of adjusting a torque by deforming the spring.

In the moving device for a rod part supporting an instrument hose according to the present disclosure, the spring is positioned on the rotation axis, and the torque adjustment unit includes a spring deforming portion that is attached to a first end of the spring and that deforms the spring in a direction in which the spring is wound up and a spring fixing portion that keeps a torque constant by coming into contact with the spring deforming portion and fixing the spring deforming portion in place.

In the moving device for a rod part supporting an instrument hose according to the present disclosure, the torque adjustment unit is disposed in a radial direction of the rotation axis and operated in the radial direction.

The moving device for a rod part supporting an instrument hose according to the present disclosure further includes a rotary unit provided with a to-be-attached portion to which the base portion of the rod part is attached, and the moving device for a rod part supporting an instrument hose according to the present disclosure has a plurality of adjustment holes formed on an outer peripheral portion of the spring deforming portion. The rotary unit and the spring deforming portion are positioned on the rotation axis, and a second end of the spring is attached to the rotary unit. The spring deforming portion is caused, by an operating member inserted in one of the adjustment holes, to rotate in a direction that is opposite to a direction in which the rod part is tilted down, so that the spring is wound up, and a torque increases.

The moving device for a rod part supporting an instrument hose according to the present disclosure further includes a housing that includes a first member and a second member. The spring fixing portion is included in the first member. The spring deforming portion, the spring, and the rotary unit are supported between the first member and the second member.

A dental examination-and-treatment apparatus according to the present disclosure includes a plurality of the moving devices for a rod part supporting an instrument hose that is arranged in the rotation axis direction and in which the torque adjustment unit is disposed in the radial direction of the rotation axis.

Advantageous Effects of Invention

A moving device for a rod part supporting an instrument hose according to the present disclosure includes a spring that generates a torque when a rod part that supports an instrument hose connected to an instrument is tilted down or tilted up about a rotation axis on a base portion side of the rod part and a torque adjustment unit that is capable of adjusting a torque by deforming the spring. Thus, a moving device that can adjust the magnitude of a torque for each instrument and that enables every user to comfortably operate every instrument is obtained.

BRIEF DESCRIPTION OF DRAWINGS

FIG. 5A and FIG. 5B are a perspective view and a side view, respectively.

FIGS. 7A and 7B illustrate a moving device for a rod part supporting an instrument hose according to a second embodiment of the present disclosure, and FIG. 7A and FIG. 7B are a perspective view and a side view, respectively.

FIGS. 8A and 8B illustrate a moving device for a rod part supporting an instrument hose according to a third embodiment of the present disclosure, and FIG. 8A and FIG. 8B are a perspective view and a side view, respectively.

FIGS. 9A and 9B illustrate a moving device for a rod part supporting an instrument hose according to a fourth embodiment of the present disclosure, and FIG. 9A and FIG. 9B are a perspective view and a side view, respectively.

FIG. 10A and FIG. 10B are a perspective view and a side view, respectively.

DESCRIPTION OF EMBODIMENTS

A moving device for a rod part supporting an instrument hose according to the present disclosure includes a spring that generates a torque when a rod part that supports an instrument hose connected to an instrument is tilted down or tilted up about a rotation axis on a base portion side of the rod part and a torque adjustment unit that is capable of adjusting a torque by deforming the spring. In other words, the magnitude of the torque in the case of pulling the instrument hose is adjusted by the torque adjustment unit. For example, in the case where the instrument or the instrument hose is heavy, when the torque is adjusted to be large, a user can comfortably operate the instrument. In contrast, for example, in the case where the instrument or the instrument hose is light, when the torque is adjusted to be small, a user can comfortably operate the instrument. In other words, a moving device for a rod part supporting an instrument hose that can adjust the magnitude of a torque for each instrument and that enables every user to comfortably operate every instrument is obtained.

In the moving device for a rod part supporting an instrument hose according to the present disclosure, the spring is positioned on the rotation axis, and the torque adjustment unit includes a spring deforming portion that is attached to a first end of the spring and that deforms the spring in a direction in which the spring is wound up and a spring fixing portion that keeps a torque constant by coming into contact with the spring deforming portion and fixing the spring deforming portion in place. In other words, as a result of the spring being deformed by the spring deforming portion, the magnitude of a torque is adjusted. In addition, when the spring deforming portion is fixed in place by the spring fixing portion, the spring is maintained in a deformed state, and the torque is kept constant. Therefore, a user can comfortably operate the instrument.

In the moving device for a rod part supporting an instrument hose according to the present disclosure, the torque adjustment unit is disposed in a radial direction of the rotation axis and operated in the radial direction. In other words, a user can operate the torque adjustment unit in the radial direction. Even if a plurality of the moving devices for a rod part supporting an instrument hose is arranged in a direction in which the rotation axis extends, a user can easily operate the torque adjustment units. Note that, if the torque adjustment unit is disposed in the direction in which the rotation axis extends, a user needs to operate the torque adjustment unit in the rotation axis direction. Thus, in the case where the plurality of moving devices for a rod part supporting an instrument hose is arranged in the rotation axis direction, an operation may sometimes be hindered.

The moving device for a rod part supporting an instrument hose according to the present disclosure further includes a rotary unit provided with a to-be-attached portion to which the base portion of the rod part is attached, and the moving device for a rod part supporting an instrument hose according to the present disclosure has a plurality of adjustment holes formed on an outer peripheral portion of the spring deforming portion. The rotary unit and the spring deforming portion are positioned on the rotation axis, and a second end of the spring is attached to the rotary unit. The spring deforming portion is caused, by an operating member inserted in one of the adjustment holes, to rotate in a direction that is opposite to a direction in which the rod part is tilted down, so that the spring is wound up, and a torque increases. Therefore, a moving device for a rod part supporting an instrument hose that can adjust the magnitude of a torque for each instrument is obtained.

The moving device for a rod part supporting an instrument hose according to the present disclosure further includes a housing formed of a first member and a second member. The spring fixing portion is included in the first member. The spring deforming portion, the spring, and the rotary unit are supported between the first member and the second member. Therefore, the torque adjustment unit having a simple configuration is obtained.

A dental examination-and-treatment apparatus according to the present disclosure includes a plurality of the moving devices for a rod part supporting an instrument hose that is arranged in the rotation axis direction and in which the torque adjustment unit is disposed in the radial direction of the rotation axis. In other words, even if the plurality of moving devices for a rod part supporting an instrument hose is positioned adjacent to each other, a user can operate the torque adjustment units in the radial direction. Therefore, the user can easily operate the torque adjustment units.

Figure 1:
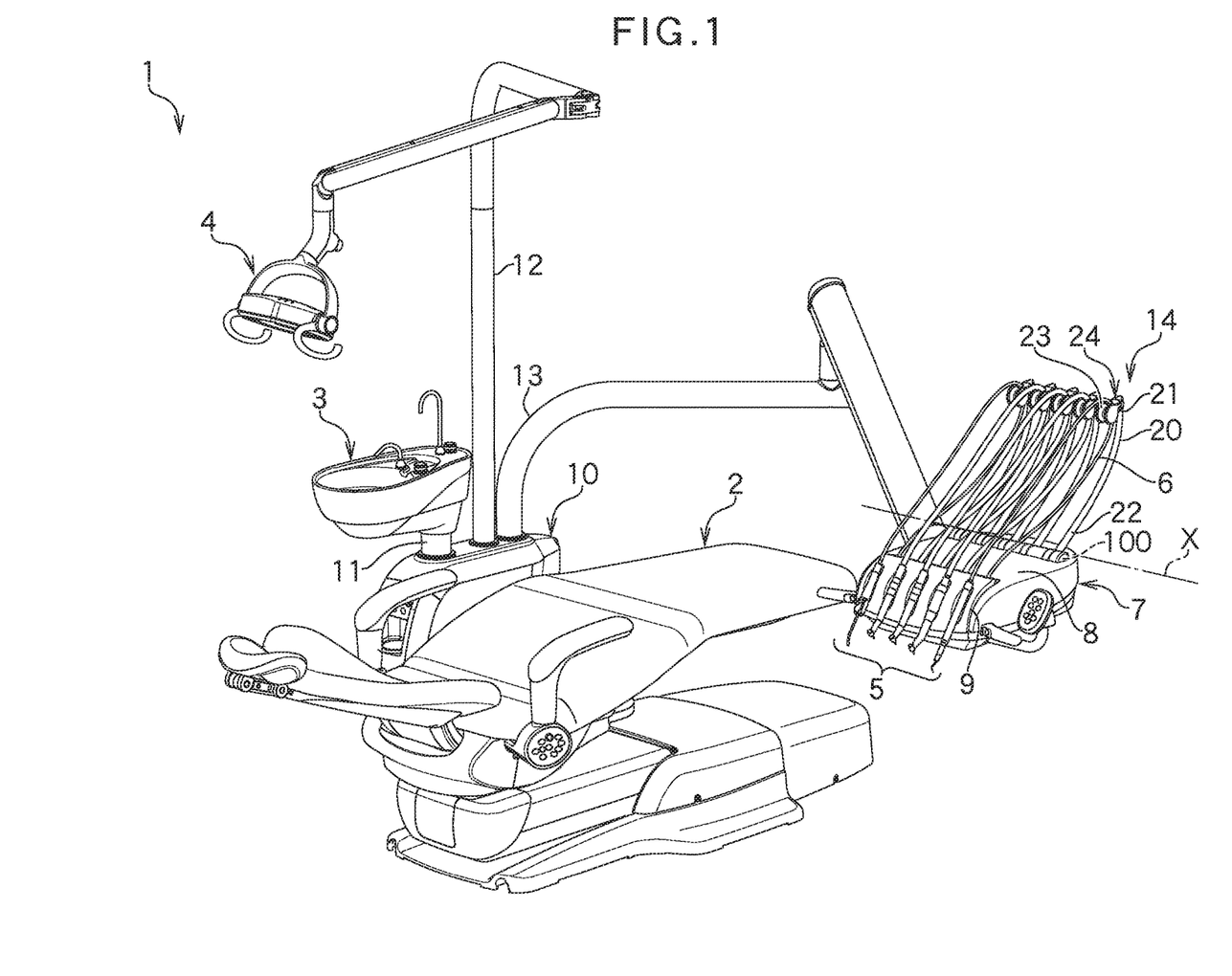
FIG. 1 is a perspective view illustrating a dental examination-and-treatment apparatus according to a first embodiment of the present disclosure.

The following are descriptions of a moving device for a rod part supporting an instrument hose (hereinafter referred to as a "moving device") according to a first embodiment of the present disclosure and a dental examination-and-treatment apparatus according to the first embodiment of the present disclosure. FIG. 1 illustrates a dental examination-and-treatment apparatus 1 that includes moving devices 100.

As illustrated in FIG. 1, the dental examination-and-treatment apparatus 1 includes an examination-and-treatment seat 2 on which a person who receives a medical treatment, that is, a patient, lies down, a spittoon 3 into which the person who receives a medical treatment spits out water from their mouth, a dental light 4 that illuminates the mouth of the person who receives a medical treatment, and an instrument holding device 7 by which various instruments 5 are held. The spittoon 3, the dental light 4, and the instrument holding device 7 are supported by a base 10. The base 10 is disposed adjacent to the examination-and-treatment seat 2.

The spittoon 3 is disposed on the base 10 with a pipe 11 interposed therebetween. The spittoon 3 is a bowl. The dental light 4 is connected to an end of a first moving arm 12 attached to the base 10. The instrument holding device 7 is connected to an end of a second moving arm 13 attached to the base 10. The first moving arm 12 and the second moving arm 13 each have a plurality of joints. Thus, the dental light 4 can be freely moved by using the first moving arm 12. In addition, the instrument holding device 7 can be freely moved by using the second moving arm 13.

Instruments 5 that are held by the instrument holding device 7 are, for example, a turbine, a micromotor, an air motor, a scaler, a syringe, and the like. Instrument hoses 6 are connected to the instruments 5.

The instrument holding device 7 includes a main body part 8, a holder part 9 in which the instruments 5 are accommodated, and instrument-hose support devices 14. The holder part 9 is attached to the front surface of the main body part 8, and in contrast, the instrument-hose support devices 14 are each attached to the top surface of a rear portion of the main body part 8.

The instrument-hose support devices 14 include rod parts 20 that support the instrument hoses 6 at positions higher than the positions of the instruments 5, which are accommodated in the holder part 9, pulley support units 24 that are supported at end portions 21 of the rod parts 20, pulleys 23 that are supported by the pulley support units 24 and on which the instrument hoses 6 are hooked, and the moving devices 100 each of which is capable of tilting down or tilting up one of the rod parts 20 about a rotation axis X on the side on which a base portion 22 of the rod part 20 is located. Note that, a direction in which the rod parts 20 are tilted down with respect to the main body part 8 will be referred to as a forward direction, and a direction in which the rod parts 20 are tilted up so as to return to their original positions with respect to the main body part 8 will be referred to as a rearward direction (see FIG. 2 and FIG. 5B).

Figure 2:
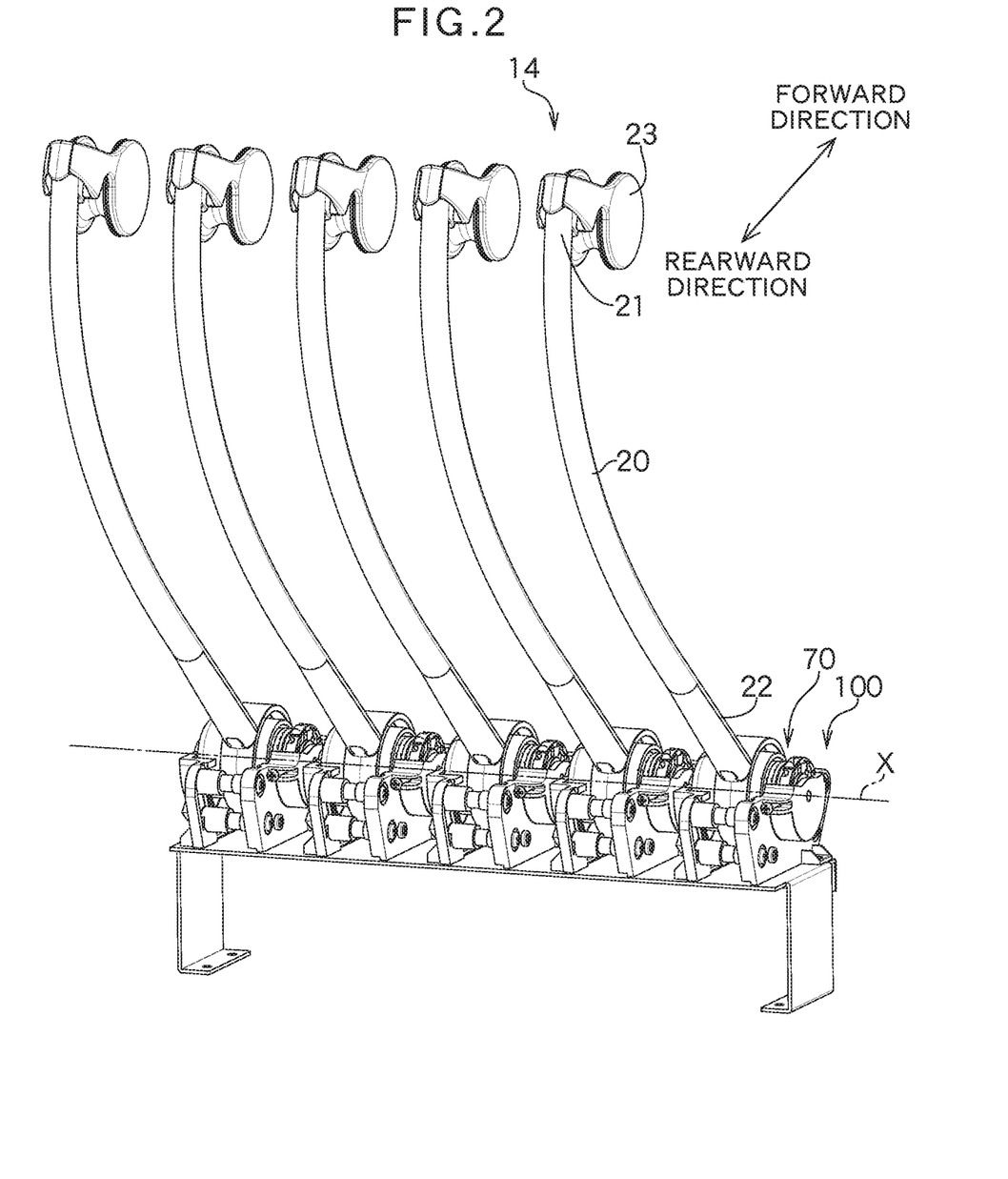
FIG. 2 is a perspective view illustrating a moving device for a rod part supporting an instrument hose according to the first embodiment of the present disclosure.
Figure 3A:
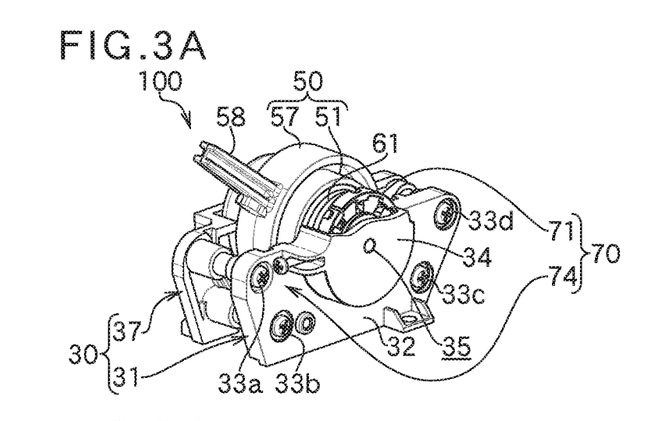
FIG. 3A and FIG. 3B are exploded perspective views each illustrating an exploded state of the moving device for a rod part supporting an instrument hose according to the first embodiment of the present disclosure.
Figure 3B:
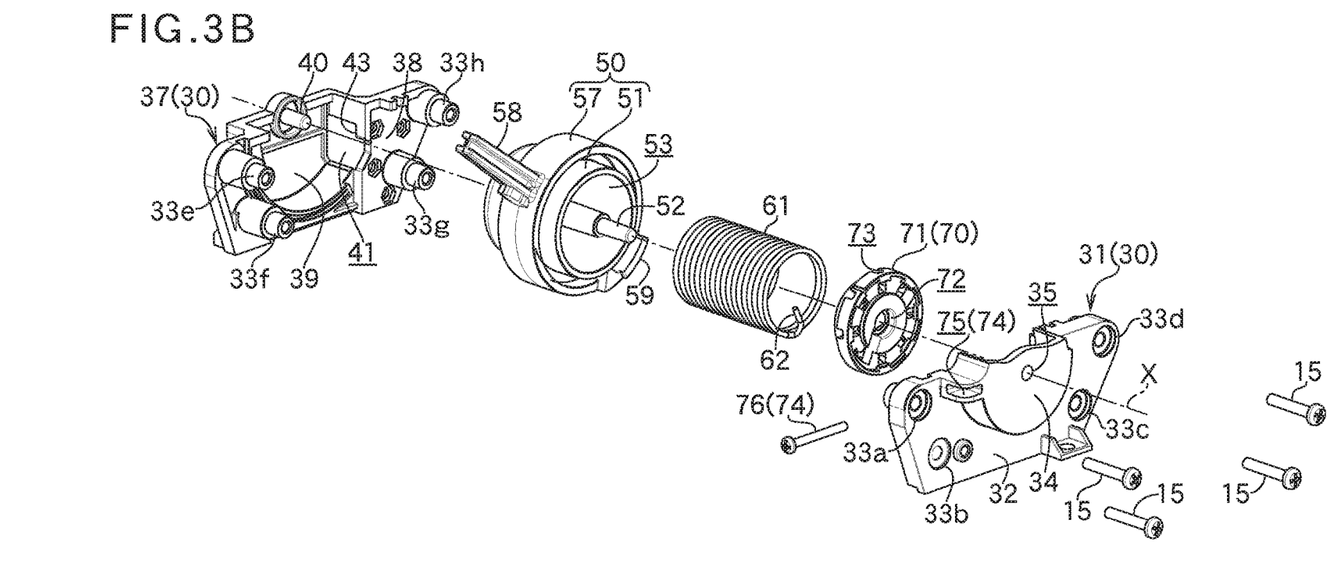
Figures 4A, 4B:
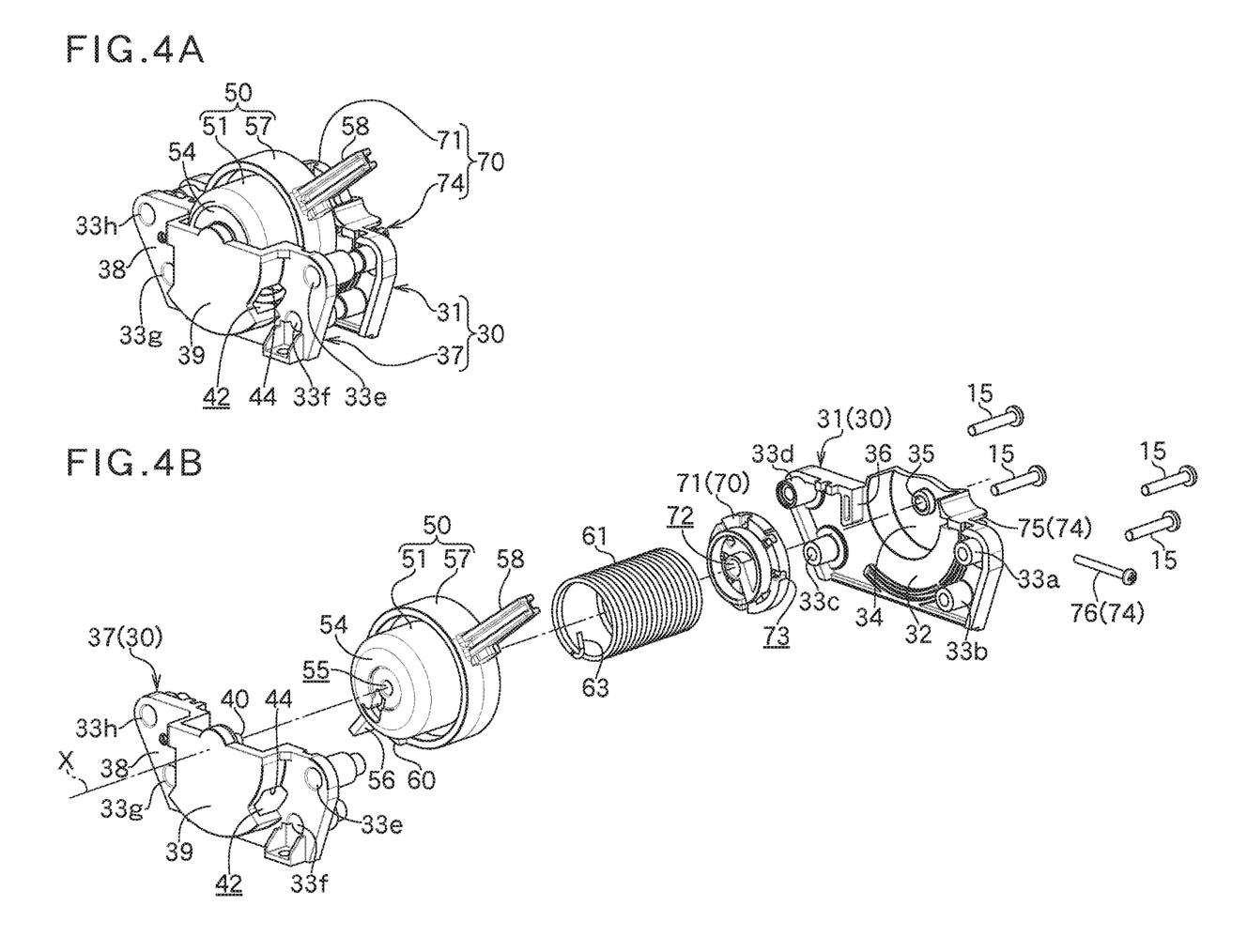
FIGS. 4A and 4B are exploded perspective views each illustrating an exploded state of the moving device for a rod part supporting an instrument hose according to the first embodiment of the present disclosure.

The following are descriptions of the instrument-hose support devices 14 and the moving devices 100. FIG. 2 illustrates the state in which the plurality of instrument-hose support devices 14 is arranged side by side when viewed from the rear, and FIG. 3A, FIG. 3B, FIG. 4A, and FIG. 4B each illustrate one of the moving devices 100 in an exploded state.

As illustrated in FIG. 2, each of the rod parts 20 has an elongated rod-like shape. The base portions 22 of the rod parts 20 are each formed in a linear shape and are connected to the moving members 100. The end portions 21 of the rod parts 20 are curved forward. The base portions 22 are attached to the moving devices 100. The plurality of instrument-hose support devices 14 is arranged side by side in the direction in which the rotation axis X extends. Accordingly, the plurality of moving devices 100 is aligned in the direction in which the rotation axis X extends and are adjacent to one another.

As illustrated in FIG. 3A, FIG. 3B, FIG. 4A, and FIG. 4B, the moving devices 100 each include a housing 30 including a first member 31 and a second member 37, a rotary unit 50 to which one of the rod parts 20 is attached, a spring 61 that generates a torque when the rod part 20 is tilted down or tilted up about the rotation axis X on the side on which the base portion 22 of the rod part 20 is located, and a torque adjustment unit 70 that is capable of adjusting the torque by deforming the spring 61.

The first member 31 of the housing 30 includes a first flat-plate portion 32 that has a substantially rectangular flat plate-like shape and a first support portion 34 that has a semicircular shape and that is formed at the center of the first flat-plate portion 32. Screw attachment portions 33a, 33b, 33c, and 33d are formed at four corners of the first flat-plate portion 32. The first support portion 34 laterally projects from the center of the first flat-plate portion 32. The first support portion 34 has a support hole 35 formed at the center thereof. A first rear-side restricting portion 36 is formed on a surface of the first flat-plate portion 32 so as to be at a forward position with respect to the first support portion 34, the surface facing the second member 37. The first rear-side restricting portion 36 projects toward the side on which the first rear-side restricting portion 36 faces the second member 37.

The second member 37 of the housing 30 includes a second flat-plate portion 38 that has a substantially rectangular flat plate-like shape and a second support portion 39 that has a semicircular shape and that is formed at the center of the second flat-plate portion 38. Screw attachment portions 33e, 33f, 33g, and 33h are formed at four corners of the second flat-plate portion 38. The second support portion 39 laterally projects from the center of the second flat-plate portion 38. A support projecting portion 40 that is included in the rotation axis X is formed at the center of the second support portion 39. The support projecting portion 40 projects toward the side on which the support projecting portion 40 faces the first member 31. The second support portion 39 is open by partially cutting away the circumference thereof such that a front window portion 41 and a rear window portion 42 are formed at the front and at the rear, respectively. A second rear-side restricting portion 43 is formed at an edge of the front window portion 41. A second front-side restricting portion 44 is formed at an edge of the rear window portion 42.

The first flat-plate portion 32 and the second flat-plate portion 38 have substantially the same shape, and the first support portion 34 and the second support portion 39 have substantially the same circumference. The support hole 35 and the support projecting portion 40 are positioned on the same axis. The position of the first rear-side restricting portion 36 on the circumference of the first support portion 34 and the position of the second rear-side restricting portion 43 on the circumference of the second support portion 39 substantially correspond to each other.

The rotary unit 50 includes a rotary main-body portion 51 that has a cylindrical shape and a rotary outer peripheral portion 57 that is formed over the outer periphery of the rotary main-body portion 51. The rotary main-body portion 51 has a rotation support shaft 52 and a spring support groove 53 that are formed on the side of the rotary main-body portion 51 facing the first member 31, and the rotary support shaft 52 is included in the rotation axis X. The rotation support shaft 52 projects from the center of the rotary main-body portion 51 toward the first member 31. The spring support groove 53 has an annular shape and is formed around the rotation support shaft 52. The rotary main-body portion 51 has an end surface portion 54 that is formed by closing the side of the rotary main-body portion 51 facing the second member 37. The end surface portion 54 has a rotation support hole 55 formed at the center thereof. The rotation support hole 55 and the rotation support shaft 52 are formed so as to be on the same axis. A second front-side restricting projection 56 is formed on a portion of the outer peripheral surface of the end surface portion 54. The rotary outer peripheral portion 57 has an annular shape, and a to-be-attached portion 58 to which the base portion 22 of the rod part 20 is attached is formed on the rotary outer peripheral portion 57. The to-be-attached portion 58 has a rod-like shape and projects from the rotary outer peripheral portion 57. A first rear-side restricting projection 59 and a second rear-side restricting projection 60 are formed at edges of the rotary outer peripheral portion 57. The first rear-side restricting projection 59 projects toward the first member 31, and the second rear-side restricting projection 60 projects toward the second member 37. The second rear-side restricting projection 60 is connected to the second front-side restricting projection 56.

The spring 61 is, for example, a torsion spring and has a first end portion 62 at one end and a second end portion 63 at the other end.

The torque adjustment unit 70 includes a spring deforming portion 71 that deforms the spring 61 in a direction in which the spring 61 is wound up and a spring fixing portion 74 that keeps a torque constant by coming into contact with the spring deforming portion 71 and fixing the spring deforming portion 71 in place. The spring deforming portion 71 has a circular plate-like shape, and a through hole 72 is formed at the center thereof. A plurality of adjustment holes 73 is formed in the outer peripheral portion of the spring deforming portion 71. The adjustment holes 73 are holes that are formed to extend from the outer peripheral portion toward the through hole 72 and are equally spaced. In addition, for example, scales or the like that indicate the degree of rotation of the rotary unit 50 are suitably marked on the outer peripheral portion of the spring deforming portion 71. The spring deforming portion 71 has a size with which the spring deforming portion 71 is accommodated in the first support portion 34 of the first member 31 of the housing 30. Note that there is another spring deforming portion 71 having, for example, a triangular shape, a quadrangular shape, a polygonal shape, or the like.

The spring fixing portion 74 is formed to be included in the first member 31 of the housing 30. More specifically, a fixing hole 75 is formed in the outer peripheral portion of the first support portion 34 of the first member 31, and a rod member 76, which is an operating member, is inserted into and removed from the fixing hole 75. In a state where the spring deforming portion 71 is accommodated in the first support portion 34, when the rod member 76 is inserted into the fixing hole 75 of the spring fixing portion 74 and into one of the adjustment holes 73 of the spring deforming portion 71, the adjustment hole 73 being coaxial with the fixing hole 75, the spring deforming portion 71 is fixed in place. Note that the shape of the operating member 76 includes any shape with which the operating member 76 can be inserted into the fixing hole 75 and each of the adjustment holes 73.

The following is a description of how to assemble the above-mentioned members.

The first end portion 62 of the spring 61 is attached to the spring deforming portion 71. The rotation support shaft 52 of the rotary unit 50 is inserted into the spring 61 so as to extend therethrough from the side on which the second end portion 63 is present, and the second end portion 63 is accommodated in the spring support groove 53 of the rotary unit 50 and attached to the rotary main-body portion 51. The rotation support shaft 52 is inserted into and extends through the through hole 72 of the spring deforming portion 71. In this state, the rotary unit 50, the spring 61, and the spring deforming portion 71 are accommodated in the housing 30 and supported between the first member 31 and the second member 37 of the housing 30. More specifically, the spring deforming portion 71 is accommodated in the first support portion 34 of the first member 31, and the rotation support shaft 52 of the rotary unit 50 is inserted into the support hole 35 of the first support portion 34. The spring deforming portion 71 is freely rotatable, and one of the adjustment holes 73 is aligned with the fixing hole 75 of the first support portion 34. The support projecting portion 40 of the second member 37 is inserted into and extends through the rotation support hole 55 of the rotary unit 50. Screws 15 are inserted into and extends through the screw attachment portions 33a to 33d of the first member 31 and are inserted into the screw attachment portions 33e to 33d of the second member 37. The members are fastened to one another with the screw 15. In the manner described above, the support projecting portion 40 of the second member 37, the rotation support shaft 52 of the rotary unit 50, the through hole 72 of the spring deforming portion 71, and the support hole 35 of the first member 31 are aligned on the same axis, so that the rotation axis X is formed.

The rotary unit 50 rotates about the rotation axis X. The movable range of the rotary unit 50 is limited by the first rear-side restricting portion 36, the second rear-side restricting portion 43, and the second front-side restricting portion 44. More specifically, the second front-side restricting projection 56 of the rotary unit 50 abuts against the second front-side restricting portion 44, so that rotation of the rotary unit 50 in the forward direction is restricted. In contrast, the first rear-side restricting projection 59 and the second rear-side restricting projection 60 of the rotary unit 50 abut against the first rear-side restricting portion 36 and the second rear-side restricting portion 43, so that rotation of the rotary unit 50 in the rearward direction is restricted. When the rotary unit 50 rotates in the forward direction, the spring 61 is wound up, and the inner diameter of the spring 61 is reduced.

The following is a description of torque adjustment. FIG. 5A, FIG. 5B, FIG. 6A, FIG. 6B, FIG. 6C, FIG. 6D, FIG. 6E, and FIG. 6F illustrate steps of the operation of the torque adjustment unit 70.

Figures 5A, 5B:
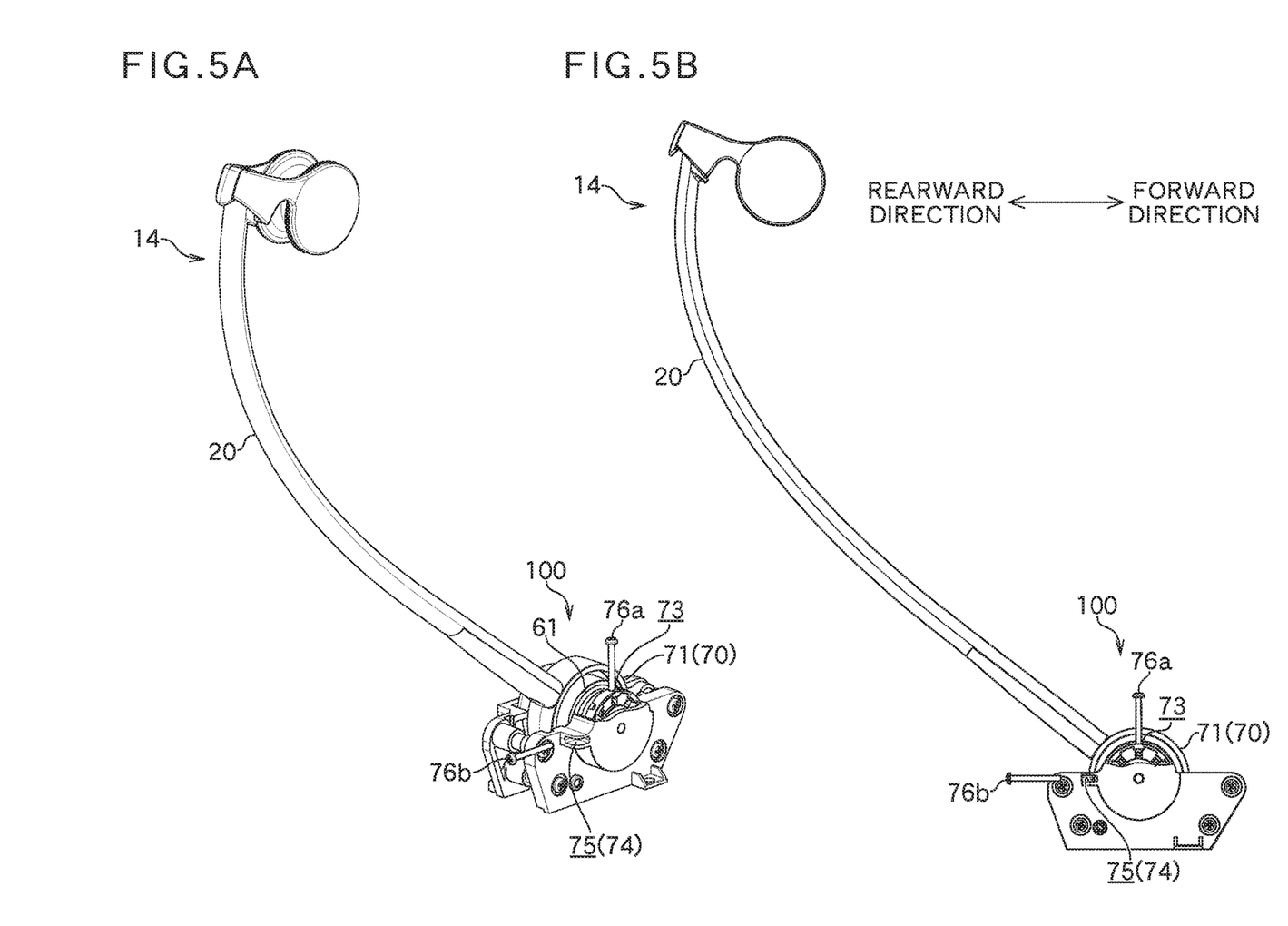
FIGS. 5A and 5B illustrate torque adjustment in the moving device for a rod part supporting an instrument hose according to the first embodiment of the present disclosure.

As illustrated in FIG. 5A and FIG. 5B, a first rod member 76a is inserted into one of the adjustment holes 73 of the spring deforming portion 71, and this first rod member 76a is operated in a direction opposite to the direction in which the rod part 20 is tilted down, so that the magnitude of the torque is changed. In the case where the first rod member 76a is tilted down rearward, and the spring deforming portion 71 rotates in the rearward direction (the counterclockwise direction in FIG. 5B), the spring 61 is twisted and tightened in the winding direction thereof, and an elastic force acts in a direction opposite to the forward direction, which is the direction in which the rod part 20 is tilted down, so that the torque increases. Thus, it becomes difficult for the rod part 20 to tilt down forward. When a second rod member 76b is inserted into the fixing hole 75 of the spring fixing portion 74 and inserted into one of the adjustment holes 73 of the spring deforming portion 71 that is coaxial with the fixing hole 75, the spring deforming portion 71 is fixed in place. Thus, the spring 61 is maintained in a twisted state, and the torque is kept constant.

Figure 6A:
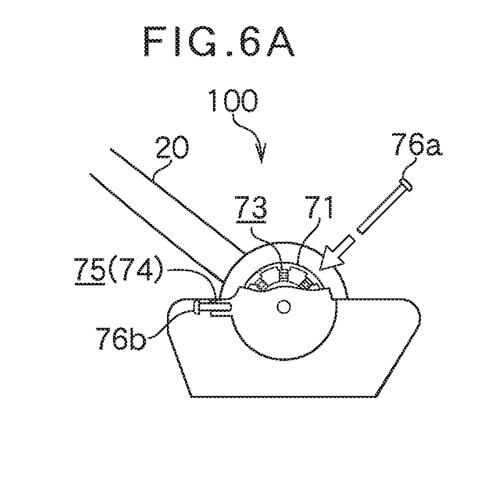
FIG. 6A, FIG. 6B, FIG. 6C, FIG. 6D, FIG. 6E, and FIG. 6F are diagrams illustrating steps of the torque adjustment in the moving device for a rod part supporting an instrument hose according to the first embodiment of the present disclosure.
Figure 6B:
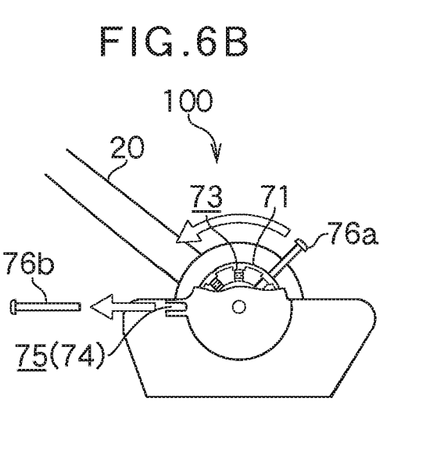
Figure 6C:
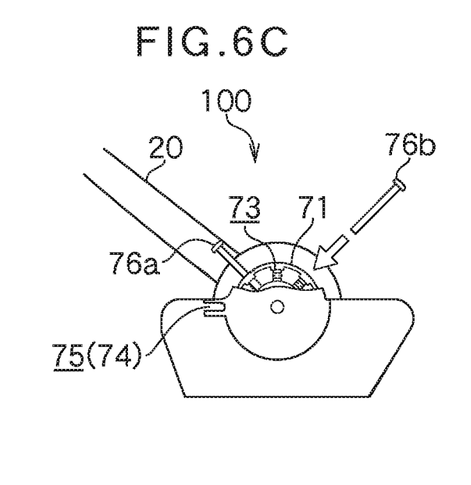
Figure 6D:
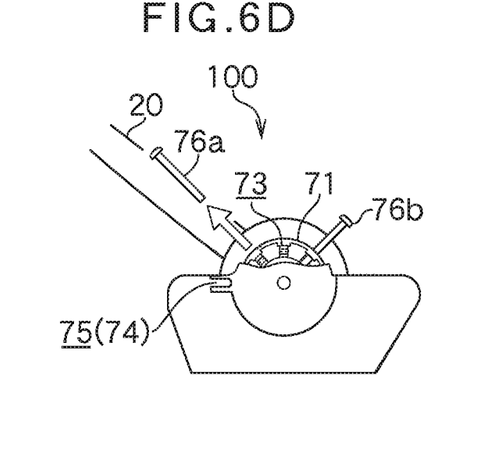
Figure 6E:
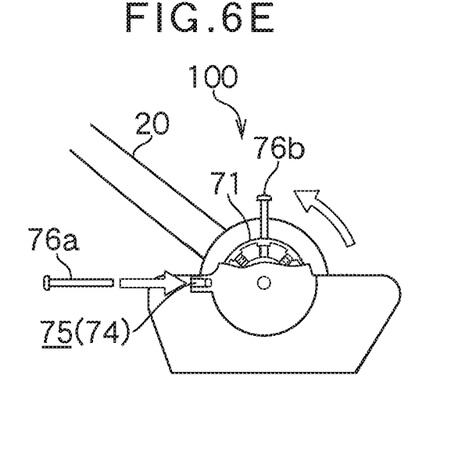
Figure 6F:
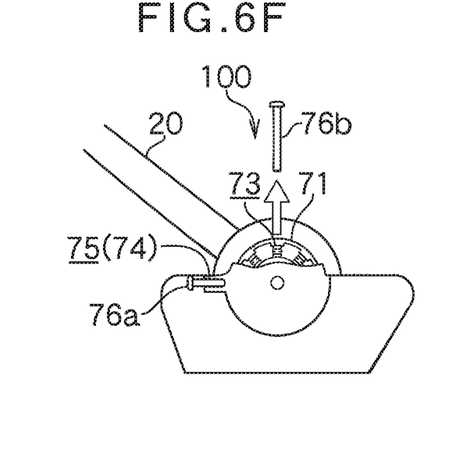

As illustrated in FIG. 6A, the second rod member 76b is inserted into the fixing hole 75 of the spring fixing portion 74 and inserted into one of the adjustment holes 73 of the spring deforming portion 71 that is coaxial with the fixing hole 75, the spring deforming portion 71 is fixed in place, and the torque is constant. As illustrated in FIG. 6B, when the second rod member 76b is pulled out, the spring deforming portion 71 becomes freely rotatable. When the first rod member 76a is inserted into any one of the adjustment holes 73 and tilted down rearward, the spring deforming portion 71 rotates in the rearward direction (rotates in the counterclockwise direction in FIGS. 6A, 6B, 6C, 6D, 6E, and 6F). As illustrated in FIG. 6C, the second rod member 76b is inserted into any one of the adjustment holes 73, and as illustrated in FIG. 6D, the first rod member 76a is pulled out from the adjustment hole 73. As illustrated in FIG. 6E, the second rod member 76b is tilted down rearward and stopped at a position desired by a user, and the spring deforming portion 71 also rotates in the rearward direction and is stopped at a position desired by a user. When the first rod member 76a is inserted into the fixing hole 75 of the spring fixing portion 74 and inserted into one of the adjustment holes 73 of the spring deforming portion 71 that is coaxial with the fixing hole 75, the spring deforming portion 71 is fixed in place as illustrated in FIG. 6F.

As described above, the spring deforming portion 71 is rotated by an amount desired by a user, so that the spring 61 is twisted and tightened in the winding direction thereof, and the torque is adjusted to a magnitude desired by the user. The torque adjustment unit 70 is disposed on the outer periphery of the rotation axis X in a radial direction (see FIG. 2), and thus, the adjacent moving devices 100 are arranged closer to each other than in the case where the torque adjustment unit 70 is formed so as to project in the direction in which the rotation axis X extends.

The following is a description of advantageous effects of the moving devices 100.

According to each of the moving devices 100, the torque adjustment unit 70 includes the spring deforming portion 71 that deforms the spring 61 in the direction in which the spring 61 is wound up and the spring fixing portion 74 that keeps a torque constant by coming into contact with the spring deforming portion 71 and fixing the spring deforming portion 71 in place (see FIG. 3A, FIG. 3B, FIG. 4A, and FIG. 4B). The spring deforming portion 71 has a circular plate-like shape, and the through hole 72 is formed at the center thereof, and the plurality of adjustment holes 73 is formed in the outer peripheral portion of the spring deforming portion 71 so as to be equally spaced. The rod member 76 is inserted into and removed from the fixing hole 75 of the spring fixing portion 74, which is formed in the outer peripheral portion of the first support portion 34 of the first member 31, so that the spring deforming portion 71 is fixed in place.

In the above configuration, when the first rod member 76a inserted in one of the adjustment holes 73 is tilted down rearward, and the spring deforming portion 71 rotates in the rearward direction, the spring 61 is twisted and tightened in the winding direction thereof, and an elastic force acts in a direction opposite to the forward direction, which is the direction in which the rod part 20 is tilted down, so that the torque increases. Thus, it becomes difficult for the rod part 20 to tilt down forward. In addition, when the second rod member 76b is inserted into the fixing hole 75 of the spring fixing portion 74 and inserted into one of the adjustment holes 73 of the spring deforming portion 71 that is coaxial with the fixing hole 75, the spring deforming portion 71 is fixed in place. Thus, the spring 61 is maintained in a twisted state, and the torque is kept constant. Here, when one of the instruments 5 is pulled forward together with the corresponding instrument hose 6, the corresponding rod part 20 is tilted down forward in such a manner as to follow the movement of the instrument hose 6 (see FIG. 1). In this case, when the rotary unit 50 rotates, a portion of the spring 61 on the side on which the first end portion 62 is present is fixed in place by the spring fixing portion 74 via the spring deforming portion 71, and a portion of the spring 61 on the side on which the second end portion 63 is present rotates in the forward direction together with the rotary unit 50 and is twisted (see FIG. 3A, FIG. 3B, FIG. 4A, and FIG. 4B). The torque in this case is set to a magnitude that is adjusted beforehand by a user using the torque adjustment unit 70. Thus, the moving devices 100 that can adjust the magnitude of a torque for each of the instruments 5 and that enable every user to comfortably operate all the instruments 5 are obtained.

Note that, when one of the instruments 5 is released from an external force, the corresponding rod part 20 is tilted up in the rearward direction by the elastic force of the spring 61. The corresponding instrument hose 6 is pulled rearward in such a manner as to follow the movement of the rod part 20, and the rod part 20 returns to its original position.

According to each of the moving devices 100, the spring fixing portion 74 is included in the first member 31 of the housing 30, and the torque adjustment unit 70 is disposed on the outer periphery of the rotation axis X in the radial direction (see FIG. 2). Although the adjacent moving devices 100 are arranged closer to each other than in the case where the torque adjustment unit 70 is formed so as to project in the direction in which the rotation axis X extends, a user can operate each of the torque adjustment units 70 in the radial direction. Even in the case where the plurality of moving devices 100 is arranged in the direction in which the rotation axis X extends, a user can easily operate each of the torque adjustment units 70. Note that, in the case where only one instrument-hose support device 14 is provided, and even in the case where the plurality of instrument-hose support devices 14 is provided, when the adjacent moving devices 100 are sufficiently spaced apart from each other, each of the torque adjustment units 70 may be operated from the side.

The following are descriptions of moving devices 200, 300, and 400 according other embodiments of the present disclosure. FIG. 7A, FIG. 7B, FIG. 8A, FIG. 8B, FIG. 9A, and FIG. 9B illustrate the appearances of instrument-hose support devices and the appearances of moving devices, and FIGS. 10A and 10B each illustrate a spring. Each of the moving devices 200 and 300 includes a torque adjustment unit that has a configuration different from that of the torque adjustment unit 70 of each of the moving devices 100 according to the first embodiment. The moving device 400 includes a spring that has a configuration different from that of the spring 61 of each of the moving devices 100. Note that a configuration different from that of each of the moving devices 100 will be mainly described, and a description of a configuration similar to that of each of the moving devices 100 will be omitted. In addition, descriptions of advantageous effects of the moving devices 200, 300, and 400 that are similar to those of the moving devices 100 will be omitted, and only advantageous effects of the moving devices 200, 300, and 400 that are different from those of the moving devices 100 will be described.

Figures 7A, 7B:
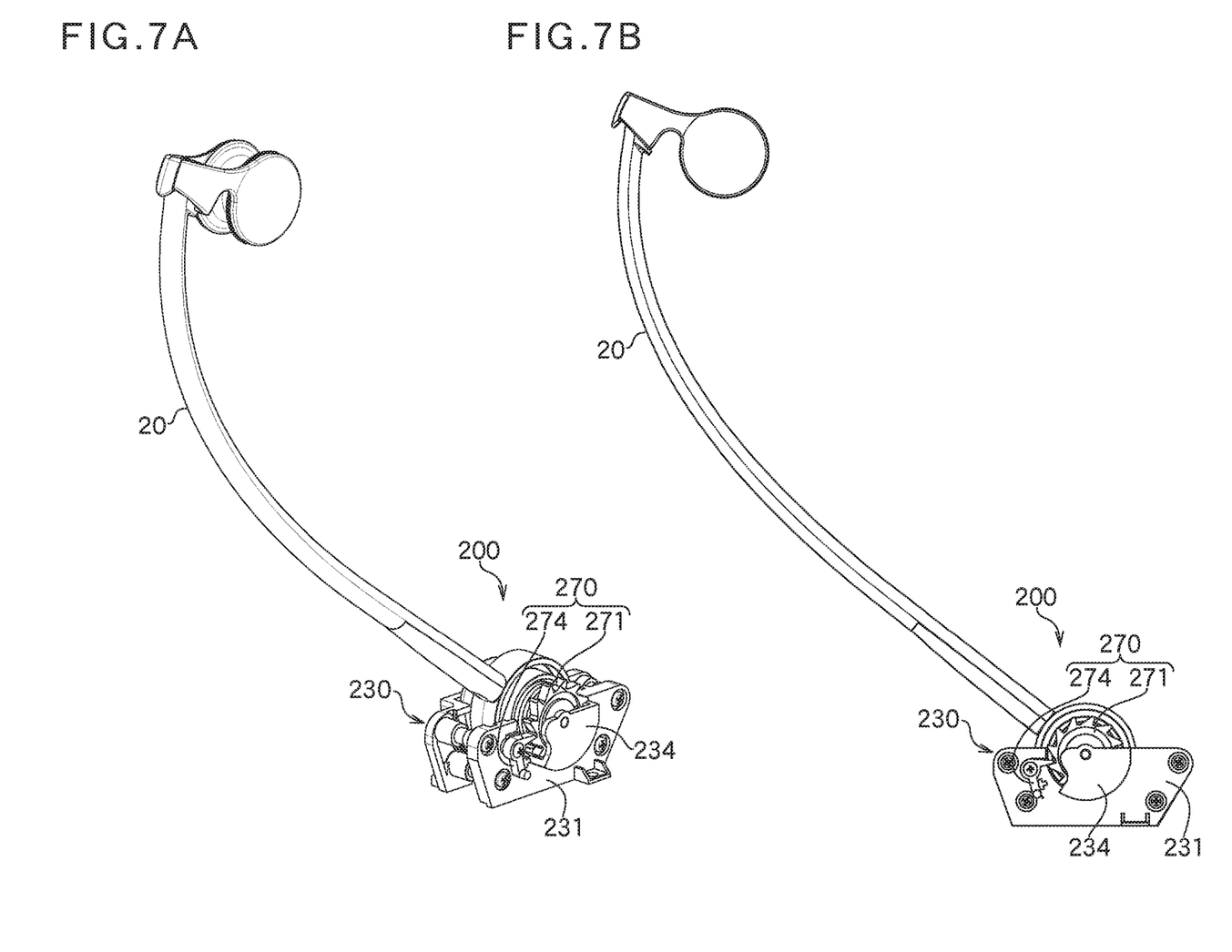

FIGS. 7A and 7B each illustrate the moving device 200 according to a second embodiment. As illustrated in FIGS. 7A and 7B, a torque adjustment unit 270 is a so-called ratchet mechanism. A spring deforming portion is a so-called ratchet gear 271 and has a plurality of teeth formed on its outer periphery. A spring fixing portion is a pawl portion 274 and is attached to a first member 231 of a housing 230. More specifically, the pawl portion 274 is disposed in a rearward position with respect to a first support portion 234 of the first member 231 and is pushed forward by a spring. The ratchet gear 271 is fixed in place as a result of the pawl portion 274 being hooked thereon. When the ratchet gear 271 rotates in the rearward direction, which is a direction opposite to a direction in which the rod part 20 is tilted down, (rotates in the counterclockwise direction in FIG. 7B), the ratchet gear 271 rotates while pushing the pawl portion 274 away. On the other hand, the ratchet gear 271 is fixed in place as a result of the pawl portion 274 being hooked thereon and does not rotate in the forward direction (does not rotate in the clockwise direction in FIG. 7B).

According to the moving device 200, an operating member is integrated with the torque adjustment unit 270, and thus, a user can easily operate the torque adjustment unit 270.

Figures 8A, 8B:
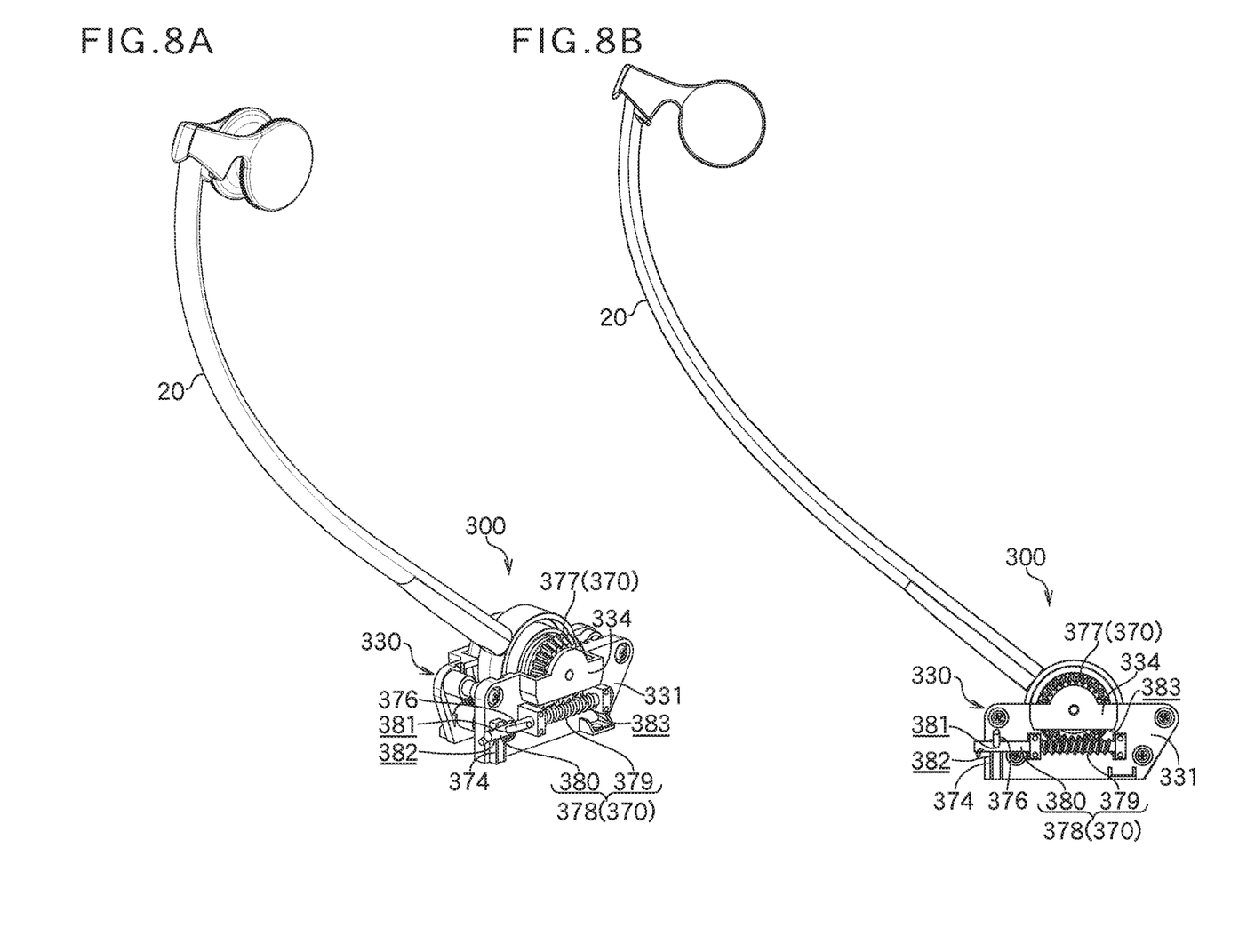

FIG. 8A and FIG. 8B each illustrate the moving device 300 according to a third embodiment. As illustrated in FIG. 8A and FIG. 8B, a torque adjustment unit 370 is a so-called worm gear mechanism. A spring deforming portion includes a worm wheel 377 and a worm 378. The worm 378 has a rod-like shape and includes a worm portion 379 formed at the front and an operating portion 380 formed at the rear. The operating portion 380 has a first operating hole 381 formed so as to extend in a direction perpendicular to the worm 378 and a second operating hole 382 formed so as to extend in a direction perpendicular to the first operating hole 381. An operating member is inserted into the first operating hole 381 or the second operating hole 382. The operating member is an L-shaped rod member 376. A spring fixing portion 374 is formed to be included in a first member 331 of the housing 330 and is positioned to the rear on a side surface of the first member 331.

A first support portion 334 of the first member 331 is open at the bottom such that a first window portion 383 is formed. The worm wheel 377 is exposed through the first window portion 383. The worm portion 379 of the worm 378 is disposed below the first support portion 334 and faces the first window portion 383. The worm portion 379 and the worm wheel 377 mesh with each other. The L-shaped rod member 376 is inserted into the first operating hole 381 and supported by the spring fixing portion 374, so that the worm wheel 377 is fixed in place. On the other hand, the L-shaped rod member 376 is pulled out from the first operating hole 381 so as to be detached from the spring fixing portion 374 and then is inserted into the second operating hole 382, so that the L-shaped rod member 376 can rotate about an axis extending in a direction perpendicular to the rotation axis X. When the L-shaped rod member 376 rotates, the worm 378 rotates, and the worm wheel 377 rotates in the rearward direction, which is a direction opposite to a direction in which the rod part 20 is tilted down (rotates in the counterclockwise direction in FIG. 8B).

According to the moving device 300, a user can operate the torque adjustment unit 370 at the rear without directly operating the worm wheel 377, which is the spring deforming portion.

Figures 9A, 9B:
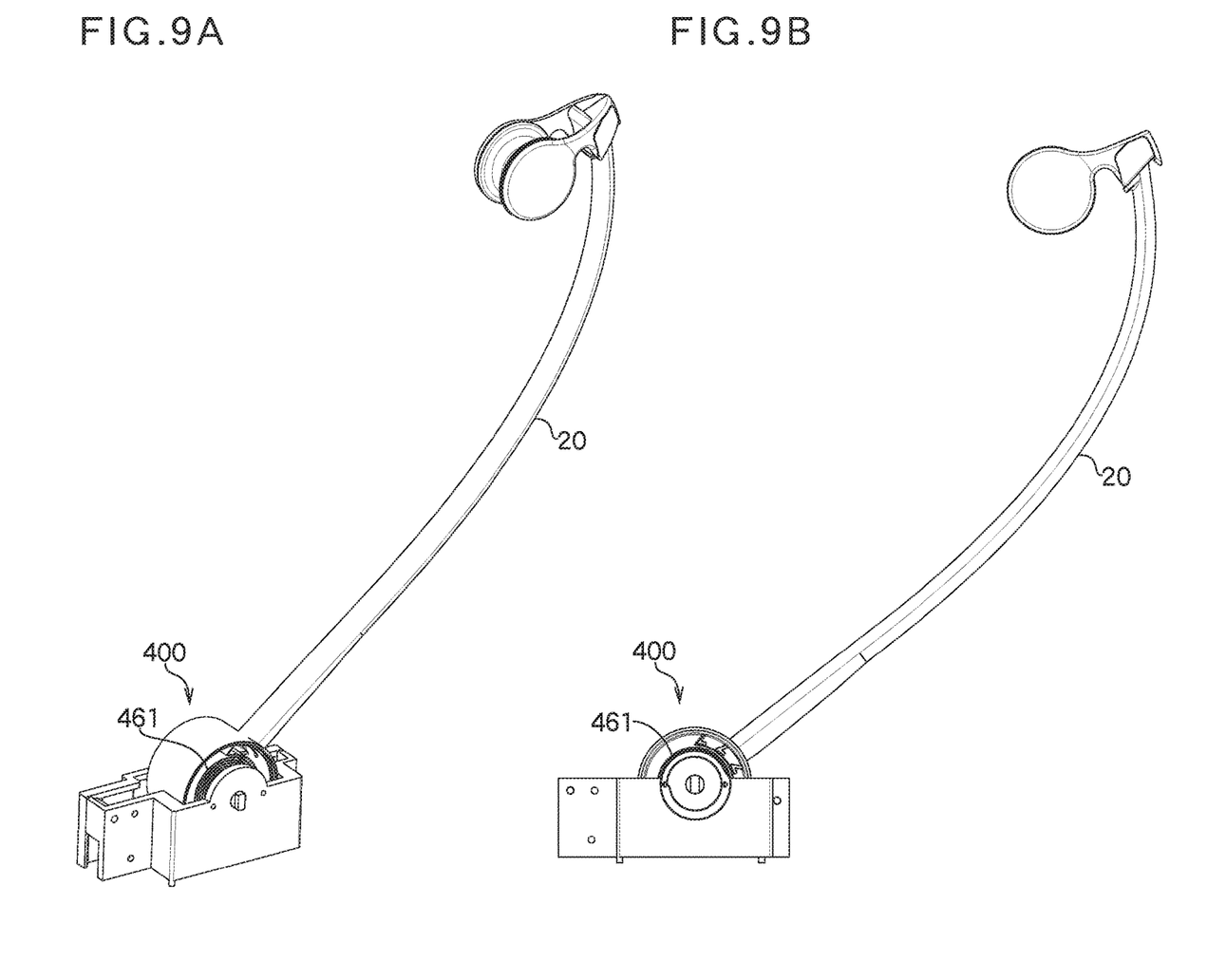
Figure 10A:
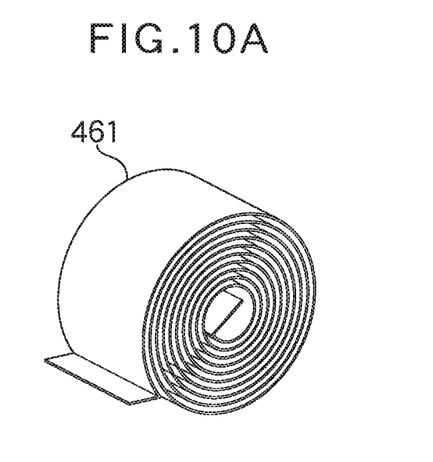
FIGS. 10A and 10B illustrate a spring included in the moving device for a rod part supporting an instrument hose according to the fourth embodiment of the present disclosure.
Figure 10B:
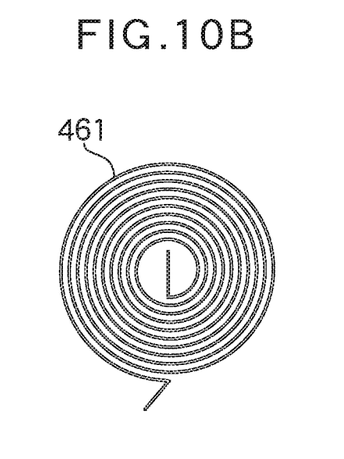

FIG. 9A and FIG. 9B each illustrate the moving device 400 according to a fourth embodiment, and FIG. 10A and FIG. 10B each illustrate a spring 461 that is used in the moving device 400. As illustrated in FIG. 9A, FIG. 9B, FIG. 10A, and FIG. 10B, the spring 461 is a coil spring. When the coil spring is tightened in a direction in which the coil spring is wound up, an elastic force acts in the forward direction, which is a direction opposite to a direction in which the rod part 20 is tilted down, and the torque increases.

Note that there are also embodiments in which the moving device 200 according to the second embodiment and the moving device 300 according to the third embodiment, which have been described above, have the configuration of the fourth embodiment. In addition, there is also an embodiment in which the torque adjustment unit is formed of a one-way clutch or a rack and pinion.

Although the embodiments of the present disclosure have been described in detail above, the present disclosure is not limited to the above-described embodiments. Various design changes can be made to the present disclosure as long as they are within the scope of the claims.

REFERENCE SIGNS LIST 1 dental examination-and-treatment apparatus
2 examination-and-treatment seat
3 spittoon
4 dental light
5 instrument
6 instrument hose
7 instrument holding device
8 main body part
9 holder part
10 base
11 pipe
12 first moving arm
13 second moving arm
14 instrument-hose support device
15 screw
20 rod part
21 end portion
22 base portion
23 pulley
24 pulley support unit
30, 230, 330 housing
31, 231, 331 first member
32 first flat-plate portion
33a to 33h screw attachment portion
34, 334 first support portion
35 support hole
36 first rear-side restricting portion
37 second member
38 second flat-plate portion
39 second support portion
40 support projecting portion (rotation axis)
41 front window portion
42 rear window portion
43 second rear-side restricting portion
44 second front-side restricting portion
50 rotary unit
51 rotary main-body portion
52 rotation support shaft (rotation axis)
53 spring support groove 54 end surface portion
55 rotation support hole
56 second front-side restricting projection
57 rotary outer peripheral portion
58 to-be-attached portion
59 first rear-side restricting projection
60 second rear-side restricting projection
61, 461 spring
62 first end portion
63 second end portion
70, 270, 370 torque adjustment unit
71 spring deforming portion
72 through hole
73 adjustment hole
74, 374 spring fixing portion
75 fixing hole
76, 76a, 76b rod member (operating member)
100, 200, 300, 400 moving device (moving device for rod part supporting instrument hose)
271 ratchet gear (spring deforming portion)
274 pawl portion (spring fixing portion)
376 L-shaped rod member (operating member)
377 worm wheel (spring deforming portion)
378 worm (spring deforming portion)
379 worm portion
380 operating portion
381 first operating hole
382 second operating hole
383 first window portion
X rotation axis

The invention claimed is:

1. A moving device for a rod part supporting an instrument hose comprising:
a spring that generates a torque when the rod part that supports an instrument hose connected to an instrument is tilted down or tilted up about a rotation axis on a base portion side of the rod part; and
a torque adjustment unit that is capable of adjusting a torque by deforming the spring without moving the rod part,
wherein the torque adjustment unit is disposed in a radial direction of the rotation axis and operated in the radial direction,
wherein the spring is positioned around the rotation axis,
wherein the torque adjustment unit includes
a spring deforming portion that is attached to a first end of the spring and that deforms the spring in a direction in which the spring is wound up and
a spring fixing portion that keeps a torque constant by coming into contact with the spring deforming portion and fixing the spring deforming portion in place,
wherein the moving device for a rod part supporting an instrument hose has a plurality of adjustment holes formed on an outer peripheral portion of the spring deforming portion.

2. A dental examination-and-treatment apparatus comprising:
a plurality of the moving devices for a rod part supporting an instrument hose according to claim 1 arranged in a direction in which the rotation axis extends.

3. The moving device for a rod part supporting an instrument hose according to claim 1, wherein the moving device for a rod part supporting an instrument hose further comprises a rotary unit provided with an attachment portion to which the base portion of the rod part is attached.

4. The moving device for a rod part supporting an instrument hose according to claim 3, wherein the rotary unit and the spring deforming portion are positioned around the rotation axis, and a second end of the spring is attached to the rotary unit.

5. A moving device for a rod part supporting an instrument hose comprising:
a spring that generates a torque when a rod part that supports an instrument hose connected to an instrument is tilted down or tilted up about a rotation axis on a base portion side of the rod part; and
a torque adjustment unit that is capable of adjusting a torque by deforming the spring,
wherein the spring is positioned around the rotation axis,
wherein the torque adjustment unit includes
a spring deforming portion that is attached to a first end of the spring and that deforms the spring in a direction in which the spring is wound up and
a spring fixing portion that keeps a torque constant by coming into contact with the spring deforming portion and fixing the spring deforming portion in place,
wherein the moving device for a rod part supporting an instrument hose further comprises a rotary unit provided with an attachment portion to which the base portion of the rod part is attached,
wherein the moving device for a rod part supporting an instrument hose has a plurality of adjustment holes formed on an outer peripheral portion of the spring deforming portion,
wherein the rotary unit and the spring deforming portion are positioned around the rotation axis, and a second end of the spring is attached to the rotary unit, and
wherein the spring deforming portion is caused, by an operating member inserted in one of the adjustment holes, to rotate in a direction that is opposite to a direction in which the rod part is tilted down, so that the spring is wound up, and a torque increases.

6. The moving device for a rod part supporting an instrument hose according to claim 5, further comprising:
a housing that includes a first member and a second member,
wherein the spring fixing portion is included in the first member, and
wherein the spring deforming portion, the spring, and the rotary unit are supported between the first member and the second member.

7. A dental examination-and-treatment apparatus comprising:
a plurality of the moving devices for a rod part supporting an instrument hose according to claim 5 arranged in a direction in which the rotation axis extends.

8. A dental examination-and-treatment apparatus comprising:
a plurality of the moving devices for a rod part supporting an instrument hose according to claim 6 arranged in a direction in which the rotation axis extends.

* * * * *